(12) United States Patent  (10) Patent No.: US 11,886,248 B2
Wang  (45) Date of Patent: Jan. 30, 2024

(54) FOLDING DISPLAY DEVICE

(71) Applicant: WUHAN CHINA STAR OPTOELECTRONICS SEMICONDUCTOR DISPLAY TECHNOLOGY CO., LTD., Wuhan (CN)

(72) Inventor: Wenqiang Wang, Wuhan (CN)

(73) Assignee: WUHAN CHINA STAR OPTOELECTRONICS SEMICONDUCTOR DISPLAY TECHNOLOGY CO., LTD., Wuhan (CN)

( * ) Notice: Subject to any disclaimer, the term of this patent is extended or adjusted under 35 U.S.C. 154(b) by 458 days.

(21) Appl. No.: 17/254,266

(22) PCT Filed: Sep. 7, 2020

(86) PCT No.: PCT/CN2020/113798
§ 371 (c)(1),
(2) Date: Dec. 19, 2020

(87) PCT Pub. No.: WO2022/041313
PCT Pub. Date: Mar. 3, 2022

(65) Prior Publication Data
US 2022/0322546 A1 Oct. 6, 2022

(30) Foreign Application Priority Data
Aug. 27, 2020 (CN) .......................... 202010878946.3

(51) Int. Cl.
G06F 1/16 (2006.01)
(52) U.S. Cl.
CPC .......... *G06F 1/1652* (2013.01); *G06F 1/1641* (2013.01); *G06F 1/1637* (2013.01)

(58) Field of Classification Search
CPC ...... G06F 1/1637; G06F 1/1652; G09F 9/301; G09F 7/18; H04M 1/0268; H04M 1/0214;
(Continued)

(56) References Cited

U.S. PATENT DOCUMENTS 10,074,824 B2 * 9/2018 Han ..................... H05K 5/0017
10,345,858 B2 * 7/2019 Han ..................... G06F 1/1652
11,176,851 B2 * 11/2021 Wang .................. H10K 77/111

FOREIGN PATENT DOCUMENTS

CN 106205394 A 12/2016
CN 107886846 A 4/2018
(Continued)

OTHER PUBLICATIONS

International Search Report in International application No. PCT/CN2020/113798, dated Apr. 29, 2021.
(Continued)

*Primary Examiner* — Dedei K Hammond
*Assistant Examiner* — Martin Antonio Asmat Uceda
(74) *Attorney, Agent, or Firm* — PV IP PC; Wei Te Chung; Zhigang Ma

(57) ABSTRACT

A folding display device includes a display panel and a support plate configured to support the display panel. The display panel includes a flexible display area. A bending area corresponding to the flexible display area is provided on the support plate, and an extensible hollow structure is provided in the bending area. By providing the hollow structure, deformability and extensibility of the bending area are improved, and a risk of peeling or cracking between layers of the display device is reduced.

14 Claims, 4 Drawing Sheets

(58) Field of Classification Search
CPC .. H05K 5/0217; H05K 5/0017; H05K 5/0018; H05K 5/0226; H05K 5/0052
USPC ........................................................ 361/807
See application file for complete search history.

(56) References Cited

FOREIGN PATENT DOCUMENTS

| | | | | | |
|---|---|---|---|---|---|
| CN | 108230907 | A | | 6/2018 | |
| CN | 109004100 | A | | 12/2018 | |
| CN | 110277022 | A | * | 9/2019 | ............. G09F 9/301 |
| CN | 110649087 | A | | 1/2020 | |
| CN | 210627726 | U | | 5/2020 | |
| CN | 210836907 | U | | 6/2020 | |
| CN | 111489651 | A | | 8/2020 | |
| CN | 111508357 | A | | 8/2020 | |
| DE | 202020100190 | U1 | | 4/2020 | |
| JP | 2002131773 | A | | 5/2002 | |
| JP | 2016173939 | A | | 9/2016 | |

OTHER PUBLICATIONS

Written Opinion of the International Search Authority in International application No. PCT/CN2020/113798, dated Apr. 29, 2021.
Chinese Office Action issued in corresponding Chinese Patent Application No. 202010878946.3 dated Mar. 19, 2021, pp. 1-9.

* cited by examiner

FOLDING DISPLAY DEVICE

RELATED APPLICATIONS

This application is a Notional Phase of PCT Patent Application No. PCT/CN2020/113798 having international filing date of Sep. 7, 2020, which claims the benefit of priority of Chinese Patent Application No. 202010878946.3 filed on Aug. 27, 2020. The contents of the above applications are all incorporated by reference as if fully set forth herein in their entirety.

FIELD OF INVENTION

The present application relates to the field of display technologies, in particular to the field of a folding display device.

BACKGROUND OF INVENTION

With the development of display device manufacturing technology, users' pursuit of diversity of display devices has become increasingly intense. Foldable display devices are widely favored by users and manufacturers because of its full sense of technology, fashion, and convenience. In the field of mobile phones, folding mobile phones show many advantages compared to conventional mobile phones. For example: to achieve scalability of a screen, have a thinner and lighter volume, reduce power consumption, and improve endurance of a device.

The application of organic light emitting diode (OLED) display panels to foldable display devices has become an industry consensus, which takes advantage of flexible and bendable characteristics of OLED display panels. Folding display devices in the prior art generally adopt a two-layer support structure to support a flexible display panel. A layer near the flexible display panel is a thin metal plate, and a layer below the thin metal plate is a two-segment support plate. The support plate itself cannot be bent, but bendability is achieved through a gap between its two-segment.

The folding display device of this structure has the following issues: The metal sheet attached to the flexible display panel has poor ductility. When the thin metal plate is bent with the flexible display panel, it will squeeze the flexible display panel, thereby increasing a risk of delamination of the display device. In addition, the two-segment support plate has a step difference in the middle bending area. This causes flatness of the display device and flatness of the screen to be poor. Furthermore, the support structure of the thin metal plate and the support plate will also cause an overall thickness of the folding display device to be larger, which is not conducive to realization of a light and thin design of the display device.

Technical Problem

The folding display device in the prior art adopts a two-layer support structure to support the flexible display panel, one layer of which is a thin metal plate, and the other layer is a two-segment support plate. The support structure has an issue that the flexible display panel is squeezed due to poor ductility of the metal plate. There is a step difference in the middle bending area of the two-segment support plate, which causes an issue of poor flatness of the display device and flatness of the screen. In addition, the thickness of the support structure is relatively large, which does not conform to the development direction of light and thin display devices.

SUMMARY OF INVENTION

Based on the above-mentioned shortcomings in the prior art, the present application provides a folding display device. By arranging a support plate with a stretchable hollow structure to support a display panel, issues of large thickness, poor flatness, and easy squeezing of the display panel in the prior art are solved.

The present application provides a folding display device comprising a display panel and a support plate. The display panel comprises at least one flexible display area. The support plate is disposed below the display panel and is configured to support the display panel. The support plate comprises at least one bending area corresponding to the flexible display area, and the bending area has an extensible hollow structure.

In the folding display device according to the present application, the support plate further comprises a non-bending area, the extensible hollow structure comprises a solid part and a hollow part, and the solid part is connected to the non-bending area.

In the folding display device according to the present application, the solid part is a network structure, and void enclosed by the solid part constitutes the hollow part.

In the folding display device according to the present application, the solid part comprises a plurality of strip-shaped solid bodies interwoven and connected with each other, and the strip-shaped bodies are curved in shape.

In the folding display device according to the present application, the hollow part comprises a plurality of first repeating units, and the first repeating units have arc-shaped edges.

In the folding display device according to the present application, the first repeating unit comprises first arc-shaped edges and second arc-shaped edges connected to two adjacent first arc-shaped edges.

In the folding display device according to the present application, the first repeating unit comprises three of the first arc-shaped edges and three of the second arc-shaped edges connected to the first arc-shaped edges, the first arc-shaped edges form three ends of the first repeating unit, and the second arc-shaped edges form three sides of the first repeating unit.

In the folding display device according to the present application, the first repeating unit is a three-fold rotational symmetric structure when the support plate is in a fully expanded state.

In the folding display device according to the present application, centers of symmetry of six of the adjacent first repeating units surrounding the same first repeating unit are located on the same circle.

In the folding display device according to the present application, the flexible display area is located at a middle position in a length direction of the display panel; and the bending area is located at a middle position in a length direction of the support plate.

In the folding display device according to the present application, the flexible display area is located near a side edge of the display panel; and the bending area is located near a side edge of the support plate.

In the folding display device according to the present application, the display panel comprises a plurality of the flexible display areas, and the support plate comprises a plurality of the bending areas provided corresponding to the flexible display areas.

In the folding display device according to the present application, a plurality of the bending areas are connected by the non-bending area.

In the folding display device according to the present application, the hollow part penetrates the support plate in a thickness direction of the support plate.

In the folding display device according to the present application, the support plate and the display panel are bonded by a flexible colloid, and at least at a position corresponding to the flexible display area of the display panel, the flexible colloid has bendability.

In the folding display device according to the present application, the folding display device further comprises a back frame assembly arranged under the support plate, wherein the back frame assembly comprises at least one folding shaft and a back plate connected to both sides of the folding shaft, and the folding shaft is disposed corresponding to the bending area; and a front frame assembly disposed above the display panel, wherein the front frame assembly comprises a first frame and a second frame, the first frame and the second frame are rotatably connected, and a connection between the first frame and the second frame corresponds to the bending area.

In the folding display device according to the present application, the folding shaft is disposed at a middle position in a length direction of the back frame assembly; or the folding shaft is disposed at a position near a side edge of the back frame assembly.

In the folding display device according to the present application, the back frame assembly comprises a plurality of the folding shafts, and the plurality of folding shafts are connected by the back plate.

In the folding display device according to the present application, a connection between the first frame and the second frame is located in a middle of a length of the front frame assembly; or the connection between the first frame and the second frame is located at a position near a side edge of the front frame assembly.

The present application further provides a folding display device. The folding display device comprises: a back frame assembly comprising at least one folding shaft and a back plate connected to both sides of the folding shaft; a support plate disposed on the back frame assembly and comprising at least one bending area corresponding to the folding shaft, wherein the bending area has an extensible hollow structure; a display panel disposed on the support plate and comprising at least one flexible display area, wherein the folding shaft and the bending area are both disposed corresponding to the flexible display area; and a front frame assembly disposed above the display panel, wherein the front frame assembly comprises a first frame and a second frame, the first frame and the second frame are rotatably connected, and a connection between the first frame and the second frame corresponds to the bending area; the extensible hollow structure comprising a solid part and a hollow part, wherein the solid part is connected to a non-bending area of the support plate, the solid part comprises a plurality of strip-shaped solid bodies interwoven and connected with each other, and void enclosed by the solid part constitutes the hollow part.

Beneficial Effect:

The folding display device provided by the present application includes a display panel and a support plate configured to support the display panel. The support plate is provided with a bending area corresponding to a flexible display area of the display panel. By arranging a hollow structure with ductility in the bending area, deformability and extensibility of the bending area are improved. Compared with the prior art, squeezing force that the display panel bears during bending and flattening process of the folding display device is reduced. This reduces a risk of delamination or cracking between layers. In addition, the integrated support plate improves flatness of the display panel and reduces an overall thickness of the display device.

DESCRIPTION OF DRAWINGS

In order to explain the embodiments or the technical solutions in the prior art more clearly, the following will briefly introduce the drawings that need to be used in the description of the embodiments or the prior art. Obviously, the drawings in the following description are only some embodiments of the present application. For those of ordinary skill in the art, other drawings can be obtained from these drawings without creative work.

DETAILED DESCRIPTION OF PREFERRED EMBODIMENTS

Figure 1:
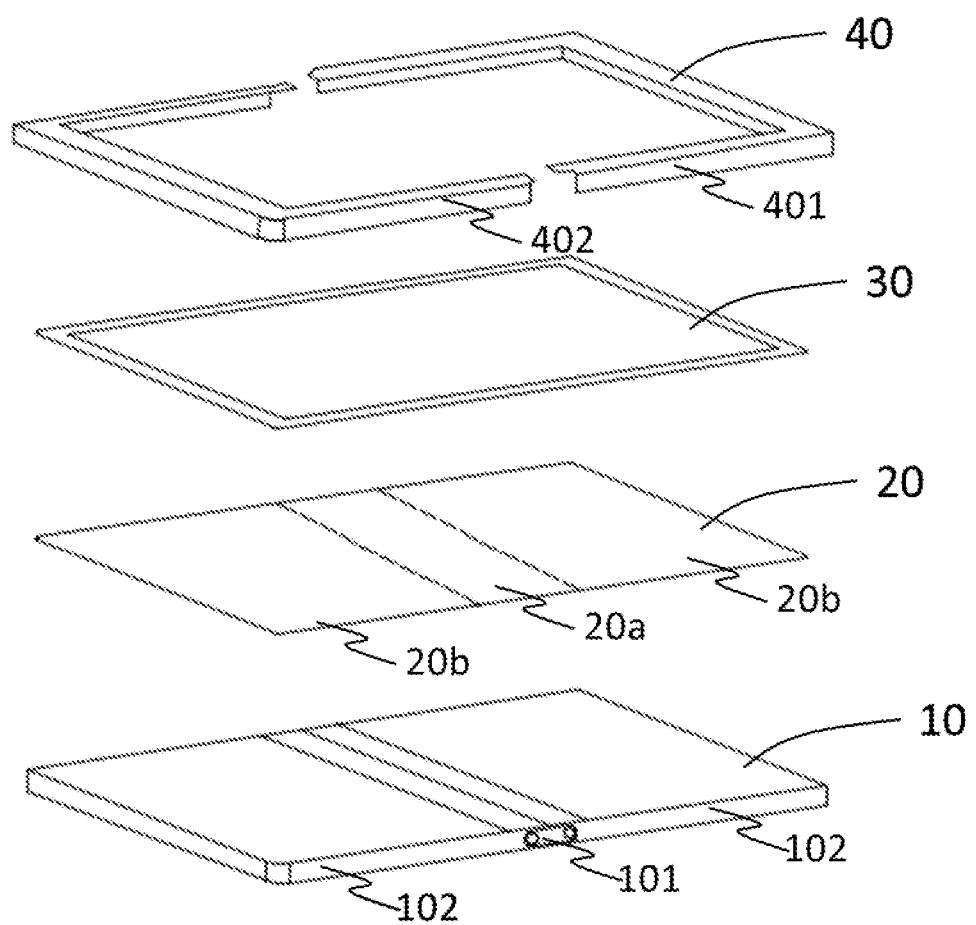
FIG. 1 is an exploded view of a structure of a folding display device provided by an embodiment of the present application.

The description of the following embodiments refers to the attached drawings to illustrate specific embodiments that can be implemented in the present application. The directional terms mentioned in the present application, such as "up", "down", "front", "rear", "left", "right", "inner", "outer", "side", etc., are only the direction of referring to the attached drawings. Therefore, the directional terms used are used to illustrate and understand the present application, rather than to limit the present application. In the figures, units with similar structures are indicated by the same reference numerals.

An embodiment of the present application provides a folding display device. The folding display device includes a display panel and a support plate configured to support the display panel. The support plate is provided with a bending area corresponding to a flexible display area of the display panel. By arranging a hollow structure with ductility in the bending area, deformability and extensibility of the bending area are improved. Compared with the prior art, squeezing force that the display panel bears during bending and flattening process of the folding display device is reduced.

This reduces a risk of delamination between layers. In addition, flatness of the display panel is improved and an overall thickness of the display device is reduced.

FIG. 1 is an exploded view of a structure of a folding display device provided by an embodiment of the present application. The folding display device includes a display panel 30 and a support plate 20 disposed under the display panel 30. The display panel 30 may be an organic light emitting diode display panel. The display panel 30 includes at least one flexible display area. During bending process of the folding display device, the display panel 30 is bent along the flexible display area. Optionally, the flexible display area may be located at a middle position in a length direction of the display panel 30 to achieve symmetrical folding of the folding display device. The flexible display area may also be located at a position near a side edge of the display panel 30 to achieve asymmetric folding of the folding display device. The display panel may further include a plurality of the flexible display areas to realize multiple folding of the folding display device.

The support plate 20 is disposed on a lower side of the display panel 30 to support the display panel 30. The support plate 20 and the display panel 30 may be bonded by a flexible colloid. In addition, at least in a position corresponding to the flexible display area of the display panel 30, the flexible colloid has bendability.

The support plate 20 includes a bending area 20a and a non-bending area 20b. The bending area 20a is arranged corresponding to the flexible display area of the display panel 30. During the bending process of the folding display device, the support plate 20 is bent along the bending area 20a. Optionally, the bending area 20a may be located at a middle position in a length direction of the support plate 20. The non-bending area 20b is connected to opposite ends of the bending area 20a. With the bending of the bending area 20a, symmetrical folding of the folding display device can be realized. The bending area 20a may also be located at a position near one side edge of the support plate 20. The non-bending area 20b is connected to opposite ends or one end of the bending area 20a. This achieves asymmetric folding of the folding display device. The support plate 20 may further include a plurality of bending areas 20a. The plurality of bending areas 20a may be connected by the non-bending area 20b. This achieves multiple folding of the folding display device.

Optionally, the folding display device may further include a back frame assembly 10 and a front frame assembly 40. The back frame assembly 10 is disposed under the support plate 20 and configured to support the support plate 20, the display panel 30, and other components in the folding display device. A cavity is opened on a side of the back frame assembly 10 facing the support plate 20. The support plate 20, the display panel 30, and other components in the folding display device may be arranged in the cavity of the back frame assembly 10. The cavity forms a wrapping and supporting effect on the support plate 20, the display panel 30, and other components in the folding display device and prevents external forces from damaging each component in the folding display device.

The back frame assembly 10 includes a folding shaft 101 and two back plates 102. The back plates 102 are connected to both ends of the folding shaft 101. The folding shaft 101 is arranged corresponding to the bending area Ai of the support plate 20. The back plates 102 can rotate around the folding shaft 101. This achieves folding or unfolding performance of the folding display device. Optionally, the folding shaft 101 may be arranged at a middle position in a length direction of the back frame assembly 10, so as to realize symmetrical folding of the folding display device. The folding shaft 101 may also be arranged at a position near one side edge of the back frame assembly 10, and the back plates 102 are connected to opposite ends of the folding shaft 101. This achieves asymmetric folding of the folding display device. The back frame assembly 10 may further include a plurality of the folding shafts 101. The plurality of folding shafts 101 may be connected through the back plates 102 to realize multiple folding of the folding display device. Optionally, the back frame assembly 10 is provided with a storage compartment near the folding shaft 101. It should be understood that when the display panel 30 and the support plate 20 are in a bent state, their bending area will form an arc-shaped protruding structure. The storage compartment provided on the back frame assembly 10 is configured to accommodate the arc-shaped protruding structure. This prevents the back frame assembly 10 from squeezing the support plate 20 and the display panel 30.

The front frame assembly 40 is disposed above the display panel 30 and is configured to fix the display panel 30, the support plate 20, and the back frame assembly 10 together. Optionally, the front frame assembly 40 includes a first frame 401 and a second frame 402. The first frame 401 and the second frame 402 are rotatably connected. The connection between the first frame 401 and the second frame 402 corresponds to the bending area 20a. Optionally, the connection between the first frame 401 and the second frame body is located at a middle position in the length direction of the front frame assembly 40. This achieves symmetrical folding of the folding display device. The connection of the first frame 401 and the second frame 402 may also be located at a position near one side edge of the front frame assembly 40 to realize asymmetric folding of the folding display device. Optionally, the front frame assembly 40 may further include a plurality of frames, and every two adjacent frames are rotatably connected, so as to realize multiple folding of the folding display device.

Figure 2:
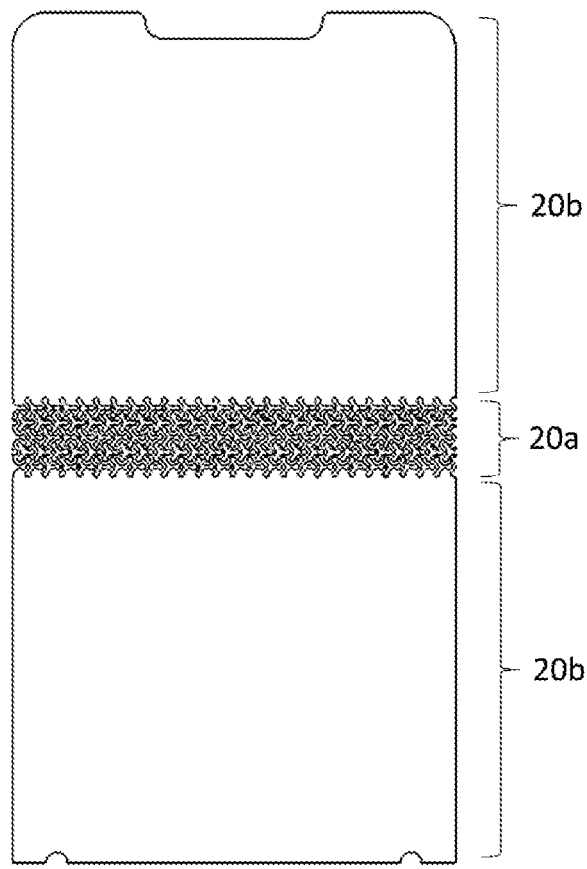
FIG. 2 is a schematic structural diagram of a support plate provided by an embodiment of the present application.
Figure 3:
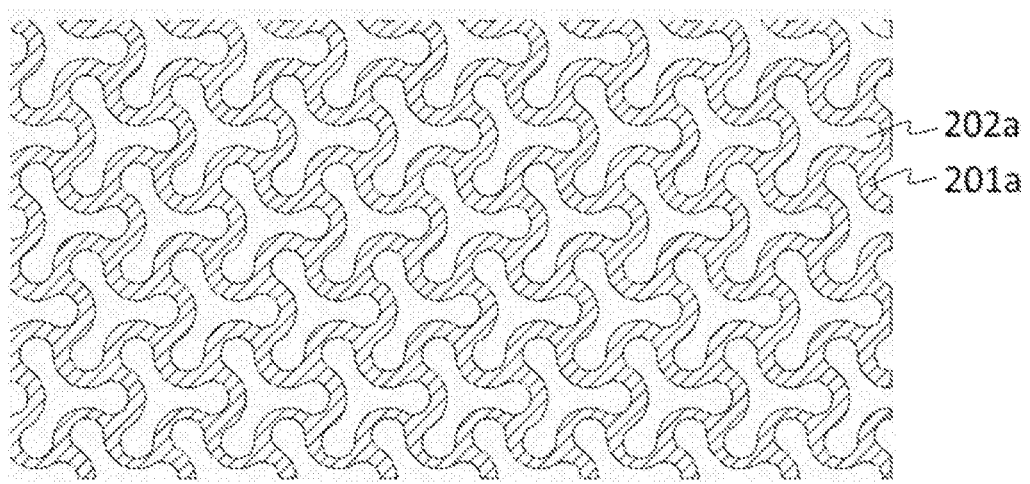
FIG. 3 is a partial enlarged view of a bending area of a support plate provided by an embodiment of the present application.
Figure 4:
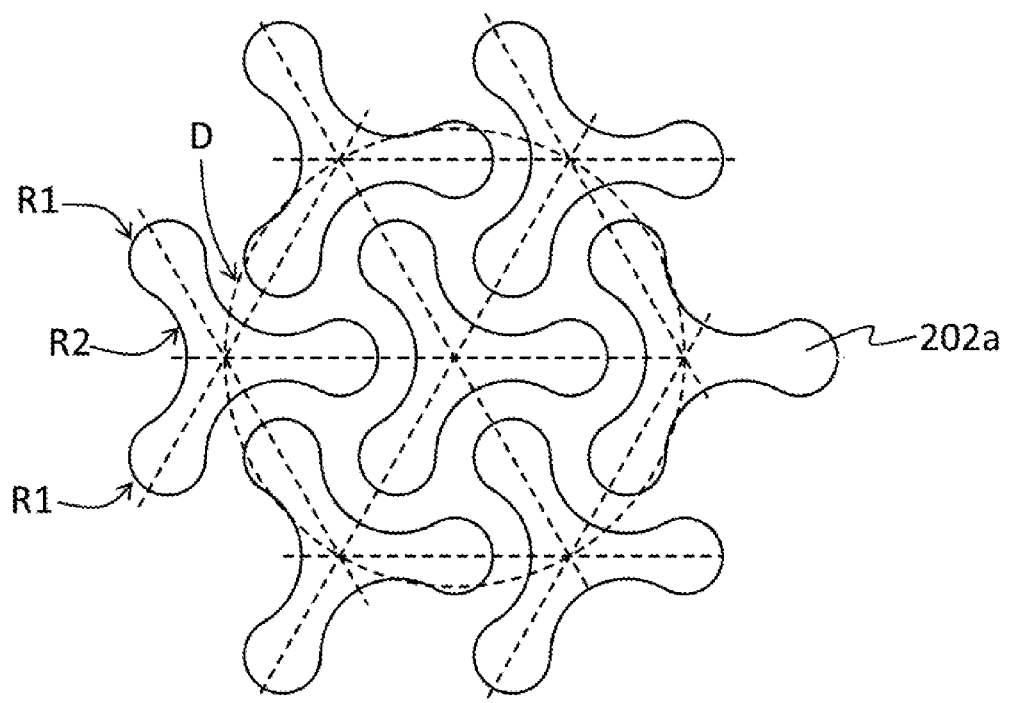
FIG. 4 is a partial enlarged view of a hollow structure of a support plate provided by an embodiment of the present application.

As shown in FIG. 2 to FIG. 4, FIG. 2 is a schematic structural diagram of a support plate provided by an embodiment of the present application, FIG. 3 is a partial enlarged view of a bending area of the support plate provided by an embodiment of the present application, and FIG. 4 is a partial enlarged view of a hollow structure of a support plate provided by an embodiment of the present application. The support plate 20 includes a bending area 20a and a non-bending area 20b connected to opposite ends of the bending area 20a. Optionally, the bending area 20a has an extensible hollow structure. The hollow structure keeps the bending area 20a ductile and bendable. During the bending process of the folding display device, the bending area 20a bends together with the flexible display area of the display panel 30 to support the flexible display area of the display panel 30. In addition, the bending area 20a produces a certain extension during the bending process, which reduces or eliminates pressing of the support plate 20 on the display panel 30 and a risk of peeling between layers of the display panel 30 and the support plate 20 due to extrusion. It should be understood that, compared with the non-bending area 20b, the bending area 20a with the hollow structure has a smaller material content per unit volume, which is beneficial to maintaining higher ductility and flexibility.

Further, the bending area 20a and the non-bending area 20b are an integrated structure. The bending area 20a and the non-bending area 20b form a complete plane supporting the display panel 30. The above-mentioned structural feature can avoid the step difference caused by the use of thin metal plates and two-segment supporting plate in the prior art. This helps to improve flatness of the display panel 30 and prevent a middle crease.

Optionally, as shown in FIG. 2 and FIG. 3, the hollow structure of the bending area 20 a includes a solid part 201*a* and a hollow part 202*a*. The solid part 201*a* is connected to the non-bending area 20*b*, so that the bending area 20*a* and the non-bending area 20*b* are connected as a whole.

Optionally, the solid part 201*a* has the same geometrical shape as a plurality strip-shaped solid bodies. The strip-shaped solid bodies are interwoven and connected to form a network structure. Void enclosed by the solid part 201*a* constitutes the hollow part 202*a*. Optionally, the hollow part 202*a* penetrates the support plate 20 along a thickness direction of the support plate 20. In some embodiments, the solid part 201*a* may be arranged along a straight line and interwoven and connected to each other, thereby forming a regular grid-like structure. In some other embodiments, the solid part 201*a* is curved. It should be noted that when the solid part 201*a* is curved, the solid part 201*a* has a relatively large extensible deformability. This makes the bending area 20*a* exhibit more excellent ductility.

Optionally, as shown in FIG. 3 and FIG. 4, the hollow part 202*a* includes a plurality of first repeating units. The first repeating unit has an arc-shaped edge. It should be noted that when the first repeating unit has an arc-shaped edge, the solid part 201 also has an arc-shaped edge. The solid body 201*a* with the arc-shaped edge structure can effectively disperse stress during the bending process. This prevents excessive stress concentration and reduces a risk of cracking due to stress concentration.

Optionally, the first repeating unit further includes a first arc-shaped edge R1 and a second arc-shaped edge R2. The second arc-shaped edge R2 is connected between two adjacent first arc-shaped edges R1. The bending direction of the first arc-shaped edge R1 is away from the solid part 201*a*. The bending direction of the second arc-shaped edge R2 faces the solid part 201*a*. The aforementioned structural feature of the first repeating unit makes the solid part 201 form a wavy edge. This further improves ability of the solid body 201*a* to disperse stress during the bending process.

Optionally, the first repeating unit further includes three of the first arc-shaped edges R1 and three of the second arc-shaped edges R2 connected to the first arc-shaped edges R1. The bending direction of the first arc-shaped edges R1 are away from the solid part 201*a*. The bending direction of the second arc-shaped edges R2 faces the solid part 201*a*. The first arc-shaped edges R1 form the three ends of the first repeating unit. The second arc-shaped edges R2 form three sides of the first repeating unit. This makes the first repeating unit have a multi-curved triangular hollow structure. It should be noted that under the condition that the first repeating unit has the above-mentioned structural characteristics, the solid part 201*a* exhibits a multi-arc cross-linked structure. This further improves stress dispersion ability during the bending process, so that the bending area 20*a* has excellent ductility and flexibility.

Optionally, a radius of an arc of the first arc-shaped edge R1 ranges from 1 mm to 2 mm. A radius of an arc of the second arc-shaped edge R2 ranges from 2 mm to 4 mm. When the support plate 20 is fully expanded, the first repeating unit has a three-fold rotational symmetric structure. Symmetric centers of six adjacent first repeating units distributed around the same first repeating unit are located on the same center circle D. It should be understood that the above-mentioned structural features of the first repeating unit can ensure that the stress distribution in each area of the bending region 20*a* is uniform during the bending process. The extension deformation of each area is balanced. This helps to keep the support plate 20 and the display panel 30 flat and fit. When the amount of expansion and contraction of the bending area 20*a* is greater than 20%, cracking failure of the support plate 20 or failure of interlayer peeling of the folding display device will not occur.

Figure 5:
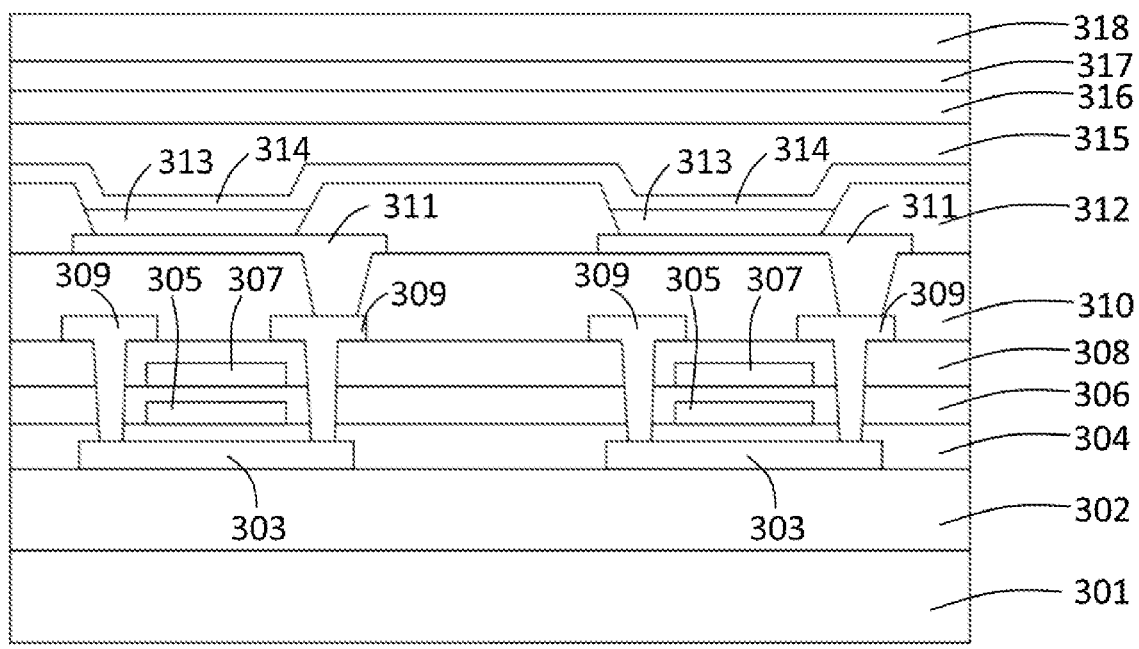
FIG. 5 is a schematic cross-sectional structure diagram of a display panel provided by an embodiment of the present application.

Optionally, the display panel 30 is an organic light emitting diode display panel. In a schematic cross-sectional structure of the display panel 30 shown in FIG. 5, a base substrate 301 may include an insulating material. At least the flexible display area is made of a flexible substrate material, such as polyimide or the like. The non-flexible display area can also be made of glass, quartz, ceramic, or plastic. A buffer layer 302 is disposed on the base substrate 301. The buffer layer 302 may include various organic materials or inorganic materials. A semiconductor layer 303 is arranged on the buffer layer 302. A substrate material of the semiconductor layer 303 may be an N-type or P-type polysilicon semiconductor, or a metal oxide semiconductor. A first gate insulating layer 304 is arranged on the semiconductor layer 303, and its material can be an insulating material including silicon nitride or silicon oxide. A first gate 305 is arranged on the first gate insulating layer 304, and the material of the first gate 305 may be a metal material Mo. The semiconductor layer 303 may be divided into a source, a channel, and a drain. The first gate 305 and the source, channel, and drain of the semiconductor layer 303 constitute the gate, source, and drain of a low-temperature polysilicon transistor or a metal oxide transistor. A second gate insulating layer 306 is arranged on the first gate 305, and its material may be an insulating material including silicon nitride or silicon oxide. A second gate 307 is arranged on the second gate insulating layer 306, and the material may be metal Mo. The second gate 307 and the first gate 305 form the upper and lower electrodes of the storage capacitor. An interlayer insulating layer 308 covers the second gate 307, and its material may be an insulating material including silicon nitride or silicon oxide. Source and drain electrode 309 is arranged on the interlayer insulating layer 308, and the material comprises one or more of gold, silver, copper, lithium, sodium, potassium, magnesium, aluminum, zinc, and combinations thereof. The source and drain electrode 309 passes through via holes on the interlayer insulating layer 308, the second gate insulating layer 306, and the first gate insulating layer 304 to electrically connected to the source and the drain of the semiconductor layer 303. A passivation layer 310 is arranged on the source and drain electrode 309, and its material may be insulating materials such as silicon nitride or silicon oxide. An anode 311 is arranged on the passivation layer 310, and its material is a combination of ITO and Ag. The anode 311 is electrically connected to the source and drain electrode 309 through the openings of the passivation layer 310. A pixel definition layer 312 is arranged on the anode 311. The pixel definition layer 312 is provided with a plurality of openings, and the shape of the openings is consistent with the pattern of the sub-pixels of the display panel 30. An organic light emitting layer 313 is in contact with the anode 311 through the opening of the pixel defining layer 312. A common cathode 314 is disposed on the pixel definition layer 312 and is in contact with the organic light emitting layer 313 through the opening on the pixel definition layer 312. A thin film encapsulation layer 315 is disposed above the common cathode 314, and its material includes a combination of organic materials and inorganic materials. A touch function layer 316 is disposed above the thin film encapsulation layer 315 for realizing the touch function of the display panel 30. A polarizing layer 317 is disposed above the touch function layer 316. The outermost layer is a cover layer 318, which plays a role in protecting the internal components of the display panel 30 from external force damage.

Figure 6:
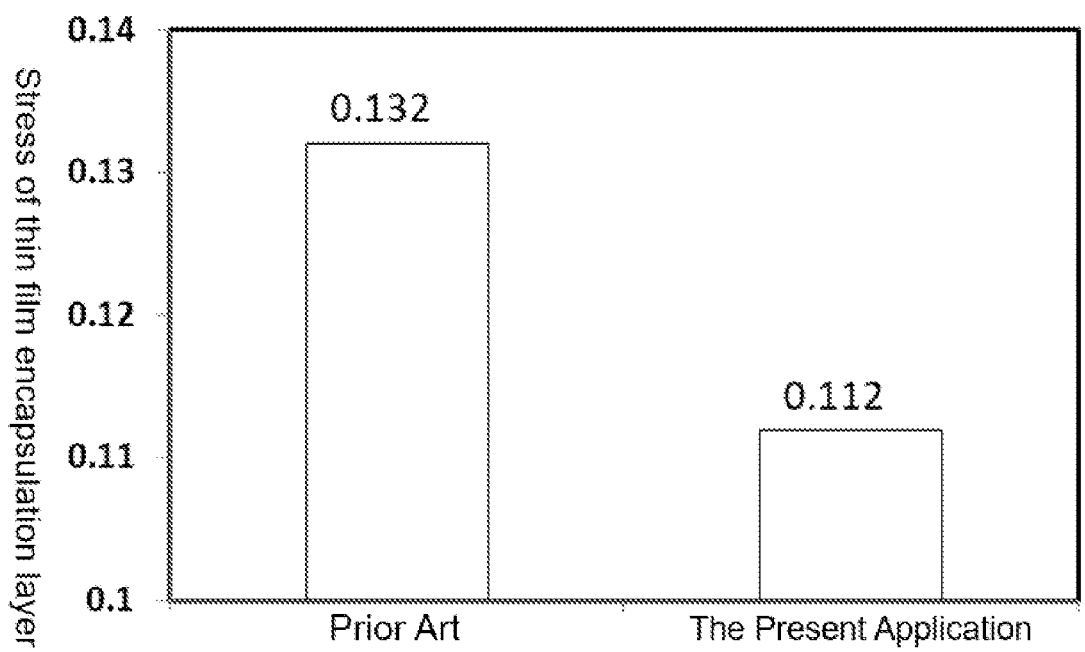
FIG. 6 is a comparison diagram of interlayer stress of film packaging layers during bending processes of a folding display device of the prior art and a folding display device of the present application.
Figure 7:
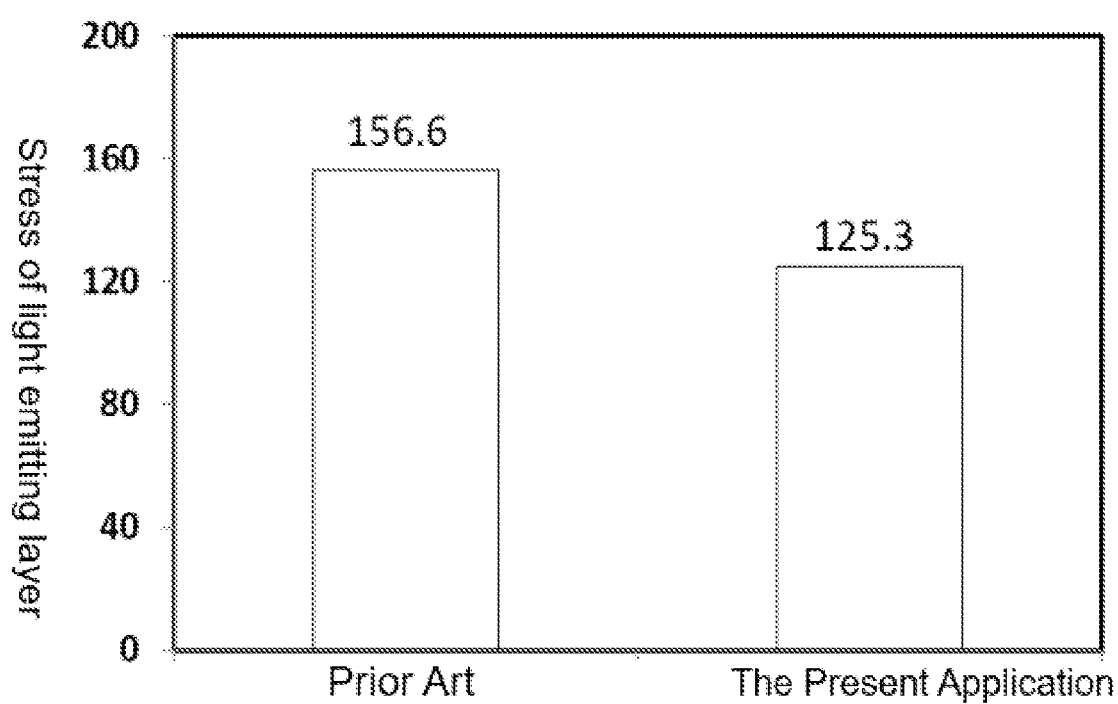
FIG. 7 is a comparison diagram of interlayer stress of light emitting layers during bending processes of a folding display device of the prior art and a folding display device of the present application.

The folding display device provided by an embodiment of the present application supports the display panel by arranging a support plate with a stretchable hollow structure. Compared with the prior art, interlayer stress of the display device is reduced, and a risk of interlayer peeling or cracking of the display device is reduced. FIG. 6 and FIG. 7 are respectively a comparison diagram of interlayer stress between a folding display device of the prior art and a folding display device of the present application during a bending process. The prior art folding display device adopts a support structure consisting of a thin metal plate and a two-segment support plate. It can be seen from FIG. 6 that the relative value of the interlayer stress in the thin film encapsulation layer of the folding display device of the present application is 0.112. The relative value of the interlayer stress in a thin film encapsulation layer of the folding display device in the prior art is 0.132. Compared with the prior art, the interlayer stress of the thin film encapsulation layer of the present application is reduced by about 15%. It can be seen from FIG. 7 that the relative value of the interlayer stress in the light emitting layer of the folding display device of the present application is 125.3. The relative value of the interlayer stress in the light emitting layer of the folding display device in the prior art is 156.6. Compared with the prior art, the interlayer stress of the light emitting layer of the present application is reduced by about 20%. It should be understood that the reduction of the interlayer stress in the folding display device is beneficial to reduce the risk of interlayer peeling or cracking.

In summary, the folding display device provided by the embodiment of the present application includes a display panel and a support plate for supporting the display panel. The support plate is provided with a bending area corresponding to a flexible display area of the display panel. A hollow structure with ductility is arranged in the bending area. By providing the hollow structure, deformability and extension ability of the bending area are improved. Compared with the prior art, squeezing force of the display panel during bending and flattening process of the folding display device is reduced, and the risk of peeling or cracking between layers is reduced. In addition, the integrated support plate improves flatness of the display panel and reduces an overall thickness of the display device.

It should be noted that although the present application is disclosed as above in specific embodiments. However, the foregoing embodiments are not intended to limit the present application. Those of ordinary skill in the art can make various changes and modifications without departing from the spirit and scope of the present application. Therefore, the protection scope of the present application is subject to the scope defined by the claims.

What is claimed is:

1. A folding display device, comprising:
    a display panel comprising at least one flexible display area;
    a support plate disposed below the display panel and configured to support the display panel, wherein the support plate comprises at least one bending area and a non-bending area, wherein the at least one bending area is corresponding to the flexible display area, and the bending area has an extensible hollow structure; and
    a back frame assembly arranged under the support plate, wherein the back frame assembly comprises at least one folding shaft and two back plates connected to both sides of the folding shaft, and the folding shaft is disposed corresponding to the bending area;
    wherein the bending area and the non-bending area are an integrated structure, the bending area and the non-bending area form a complete plane supporting the display panel;
    wherein the extensible hollow structure comprises a solid part and a hollow part, and the solid part is connected to the non-bending area;
    wherein the solid part is a network structure, and void enclosed by the solid part constitutes the hollow part;
    wherein the solid part has the same geometrical shape as a plurality of strip-shaped solid bodies interwoven and connected with each other, and the strip-shaped bodies are curved in shape;
    wherein the hollow part comprises a plurality of first repeating units, and the first repeating units have arc-shaped edges;
    wherein the first repeating unit comprises first arc-shaped edges and second arc-shaped edges connected to two adjacent first arc-shaped edges; and
    wherein the first repeating unit comprises three of the first arc-shaped edges and three of the second arc-shaped edges connected to the first arc-shaped edges, the first arc-shaped edges form three ends of the first repeating unit, and the second arc-shaped edges form three sides of the first repeating unit.

2. The folding display device according to claim 1, wherein the first repeating unit is a three-fold rotational symmetric structure when the support plate is in a fully expanded state.

3. The folding display device according to claim 2, wherein centers of symmetry of six adjacent first repeating units surrounding the same first repeating unit are located on the same circle.

4. The folding display device according to claim 1, wherein the flexible display area is located at a middle position in a length direction of the display panel; and the bending area is located at a middle position in a length direction of the support plate.

5. The folding display device according to claim 1, wherein the flexible display area is located near a side edge of the display panel; and the bending area is located near a side edge of the support plate.

6. The folding display device according to claim 1, wherein the display panel comprises a plurality of the flexible display areas, and the support plate comprises a plurality of the bending areas provided corresponding to the flexible display areas.

7. The folding display device according to claim 6, wherein a plurality of the bending areas are connected by the non-bending area.

8. The folding display device according to claim 1, wherein the hollow part penetrates the support plate in a thickness direction of the support plate.

9. The folding display device according to claim 1, wherein the support plate and the display panel are bonded by a flexible colloid, and at least at a position corresponding to the flexible display area of the display panel, the flexible colloid has bendability.

10. The folding display device according to claim 1, further comprising:
    a front frame assembly disposed above the display panel, wherein the front frame assembly comprises a first frame and a second frame, the first frame and the second frame are rotatably connected, and a connection between the first frame and the second frame corresponds to the bending area.

11. The folding display device according to claim 10, wherein a connection between the first frame and the second frame is located in a middle of a length of the front frame assembly; or the connection between the first frame and the second frame is located at a position near a side edge of the front frame assembly.

12. The folding display device according to claim 1, wherein the folding shaft is disposed at a middle position in a length direction of the back frame assembly; or the folding shaft is disposed at a position near a side edge of the back frame assembly.

13. The folding display device according to claim 1, wherein the back frame assembly comprises a plurality of the folding shafts, and the plurality of folding shafts are connected by the back plates.

14. A folding display device, comprising:
 a back frame assembly comprising at least one folding shaft and two back plates connected to both sides of the folding shaft;
 a support plate disposed on the back frame assembly and comprising at least one bending area corresponding to the folding shaft, wherein the back frame assembly is arranged under the support plate, and the bending area has an extensible hollow structure;
 a display panel disposed on the support plate and comprising at least one flexible display area, wherein the folding shaft and the bending area are both disposed corresponding to the flexible display area; and
 a front frame assembly disposed above the display panel, wherein the front frame assembly comprises a first frame and a second frame, the first frame and the second frame are rotatably connected, and a connection between the first frame and the second frame corresponds to the bending area;
 the extensible hollow structure comprising a solid part and a hollow part, wherein the solid part is connected to a non-bending area of the support plate, the solid part has the same geometrical shape as a plurality of strip-shaped solid bodies interwoven and connected with each other, and void enclosed by the solid part constitutes the hollow part;
 wherein the bending area and the non-bending area are an integrated structure, the bending area and the non-bending area form a complete plane supporting the display panel;
 wherein the solid part is a network structure, and the strip-shaped bodies are curved in shape;
 wherein the hollow part comprises a plurality of first repeating units, and the first repeating units have arc-shaped edges;
 wherein the first repeating unit comprises first arc-shaped edges and second arc-shaped edges connected to two adjacent first arc-shaped edges; and
 wherein the first repeating unit comprises three of the first arc-shaped edges and three of the second arc-shaped edges connected to the first arc-shaped edges, the first arc-shaped edges form three ends of the first repeating unit, and the second arc-shaped edges form three sides of the first repeating unit.

* * * * *